United States Patent [19]

Schueman

[11] Patent Number: 5,462,301

[45] Date of Patent: Oct. 31, 1995

[54] MEANS FOR MOUNTING AN AIR POWERED ACTUATOR FOR RETRACTING THE LOCKING PINS OF A SLIDER

[75] Inventor: Gerald L. Schueman, Oakland, Iowa

[73] Assignee: Schueman Enterprises, Inc., Oakland, Iowa

[21] Appl. No.: 422,213

[22] Filed: Apr. 14, 1995

Related U.S. Application Data

[63] Continuation-in-part of Ser. No. 195,852, Feb. 10, 1994, Pat. No. 5,449,187.

[51] Int. Cl.$^6$ .................................................. B60P 1/00
[52] U.S. Cl. .................................. 280/149.2; 280/407.1; 180/24.02; 180/209
[58] Field of Search .................. 280/149.2, 407.1, 280/407, 405.1, 428, 432, 80.1; 180/24.02, 24.01, 209, 906

[56] References Cited

U.S. PATENT DOCUMENTS

| | | | |
|---|---|---|---|
| 2,935,332 | 5/1960 | Delay | 280/81 |
| 2,976,051 | 3/1961 | Morey | 280/81 |
| 3,146,000 | 8/1964 | Holzman | 280/81 |
| 3,365,211 | 1/1968 | Ginsburg | 280/81 |
| 3,372,946 | 3/1968 | Hutchens | 280/81 |
| 3,778,079 | 12/1973 | Vornberger et al. | 280/80 B |
| 4,286,797 | 9/1981 | Mekosh, Jr. et al. | 280/149.2 |
| 4,635,742 | 1/1987 | Bertolini | 180/209 |
| 4,838,566 | 6/1989 | Baxter et al. | 280/149.2 |
| 4,838,578 | 6/1989 | Baxter | 280/149.2 |
| 4,944,522 | 7/1990 | Hart | 280/149.2 |
| 4,993,737 | 2/1991 | Torcomian | 280/149.2 |
| 5,137,296 | 8/1992 | Forman | 280/407.1 |
| 5,199,732 | 4/1993 | Lands et al. | 180/209 |
| 5,232,234 | 8/1993 | McCombs | 280/80.1 |
| 5,314,201 | 5/1994 | Wessels | 280/149.2 |
| 5,346,233 | 9/1994 | Moser | 280/149.2 |

*Primary Examiner*—Margaret A. Focarino
*Assistant Examiner*—Christopher Ellis
*Attorney, Agent, or Firm*—Zarley, McKee, Thomte, Voorhees & Sease; Dennis L. Thomte

[57] ABSTRACT

A mounting bracket for mounting an air powered actuator for retracting the locking pins of a slider comprising a vertically disposed central position having first and second support arms extending therefrom for attachment to spaced-apart frame members of the slider frame. A horizontally disposed tube is secured to the upper end of the central portion of the mounting bracket and has an elongated rod removably received thereby. One end of the elongated rod extends through one of the frame members, while the other end of the elongated rod extends through the other of the frame members.

1 Claim, 4 Drawing Sheets

MEANS FOR MOUNTING AN AIR POWERED ACTUATOR FOR RETRACTING THE LOCKING PINS OF A SLIDER

CROSS-REFERENCE TO RELATED APPLICATION

This is a continuation-in-part application of application Ser. No. 08/195,852 filed Feb. 10, 1994, now U.S. Pat. No. 5,449,187, entitled "AN AIR POWERED ACTUATOR FOR RETRACTING THE LOCKING PINS OF A SLIDER"

BACKGROUND OF THE INVENTION

1. Field of the Invention

This invention relates generally to a slider which is used to adjust the suspension of a vehicle longitudinally with respect to the body of the vehicle, and more particularly to an air powered actuator for retracting the locking pins of the slider. In particular, this invention relates to a means for mounting the air powered actuator on the slider.

2. Background of the Invention

Sliders are commonly used to enable longitudinal adjustment of the suspension of a tandem axle trailer relative to the van or body of the trailer. Conventional sliders normally comprise a pair of side rails which are secured to the left and right sides of the van and which extend longitudinally therealong at the underside thereof. The suspension of the trailer is carried by a frame which includes left and right slide members which are slidably mounted with respect to the side rails of the van. A plurality of locking pins lock the frame in various positions with respect to the side rails. When it is desired to adjust the suspension of the trailer with respect to the body, the locking pins are retracted to permit the frame to slide with respect to the side rails of the van. However, if the vehicle is not sitting on perfectly level ground, the locking pins may be difficult to pull from their registering openings in the frame and the side rails of the body. Heretofore, the normal procedure for freeing the locking pins was to have one person pull on the actuating arm connected to the locking pins while the driver attempted to jiggle or jog the trailer with respect to the tandem axle, which had been previously locked in place with the air powered emergency brake. The above solution was not satisfactory and an effort to solve the problem is disclosed in U.S. Pat. No. 4,838,566. Although it is believed that the device of the '566 patent makes the problem described above easier to solve, it is still believed that the device disclosed in the '566 patent does not completely solve the problems of retracting the locking pins from their registering openings in the frame and the side rails of the trailer.

Although the invention disclosed in the co-pending application Ser. No. 08/243,984 solves certain of the problems of the prior art, it was found that it was somewhat difficult or inconvenient to mount the air powered actuator on certain types of sliders.

SUMMARY OF THE INVENTION

The invention described herein provides an improved structure for mounting the air powered actuator of my previous inventions on certain types of sliders. The means for mounting the air powered actuator of this invention includes a mounting bracket having a substantially vertically disposed central portion including an upper end, a lower end, a rearward end, and a forward end. A first support extends forwardly from the forward end of the central portion at the lower end of the central portion at the lower end thereof. The first support arm is secured to one of the frame members of the slider at the lower end thereof. A second support art extends rearwardly from the rearward end of the central portion at the lower end thereof. The second support arm is secured to a second frame member of the slider at the lower end thereof. A horizontally disposed tube is secured to the upper end of the central portion of the mounting bracket. An elongated rod is removably received by the tube with the ends of the elongated rod extending through the frame members to which the support arms are secured at the upper end thereof.

It is therefore a principal object of the invention to provide an improved method of mounting an air powered actuator for retracting the locking pins of a slider.

A further object of the invention is to provide an improved method of mounting an air powered actuator for a slider which enables the air powered actuator to be easily secured to the frame of the slider without extensive modification thereof.

Still another object of the invention is to provide a means for mounting the air powered actuator of a slider which enables the mounting bracket portion thereof to be installed on the frame of the slider during the fabrication of the slider with the air actuator canister then being secured to the bracket at a later time.

These and other objects will be apparent to those skilled in the art.

DESCRIPTION OF THE PREFERRED EMBODIMENT

Figure 1:
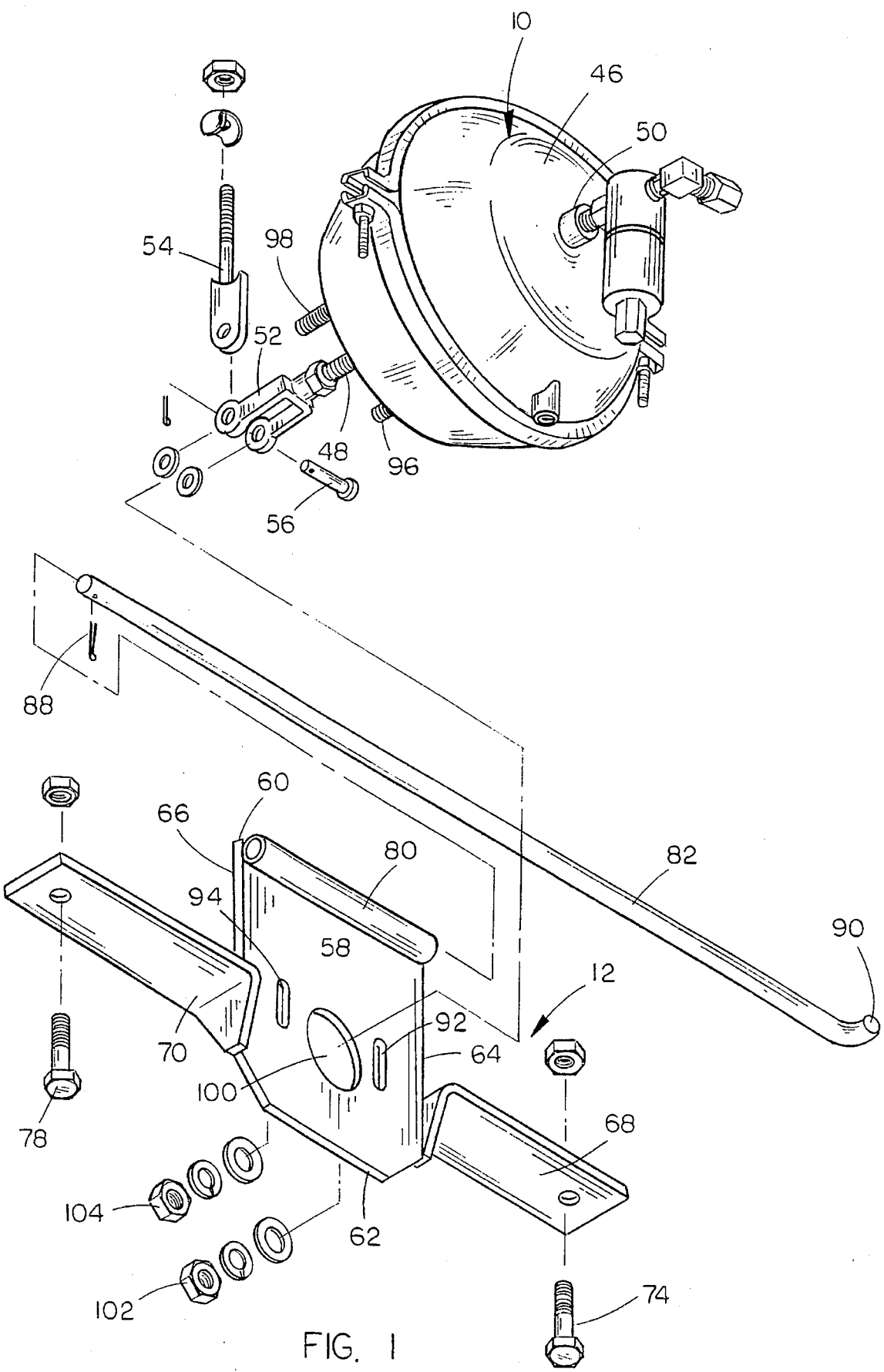
FIG. 1 is a perspective view of the means for mounting the air powered actuator.

Referring to the drawings, the numeral 10 refers to the air powered actuator such as described in my co-pending application. The numeral 12 generally refers to a mounting bracket which is utilized to secured the air powered actuator 10 to a pair of frame members 14 and 16 of frame 18 of slider 20. Slider 20 includes a pair of slide members 22 and 24 which are slidably mounted on the frame members 26 and 28 of the trailer.

Figure 2:
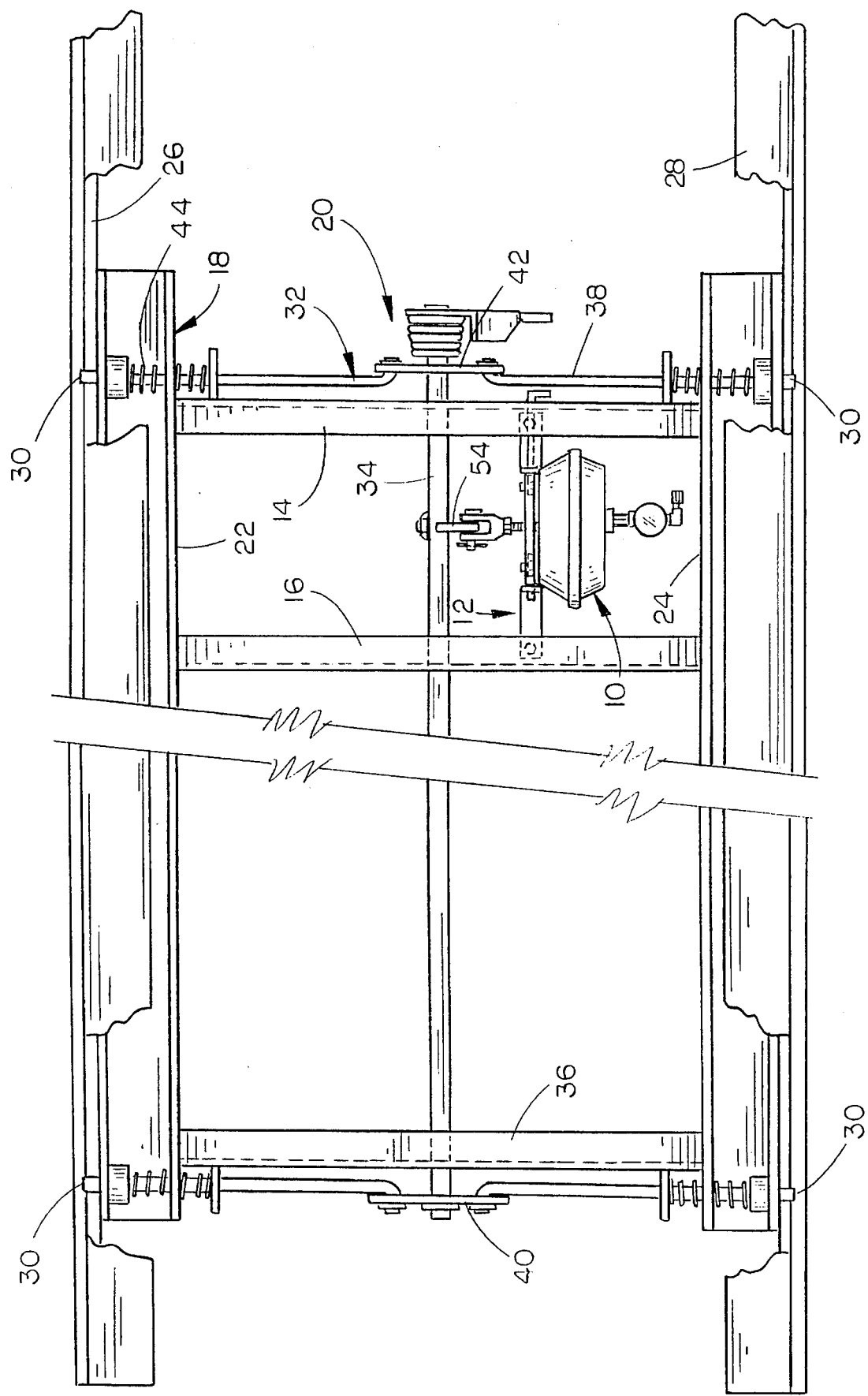
FIG. 2 is an end view illustrating the means by which the air powered actuator is connected to the crank shaft of the locking pin linkage.
Figure 3:
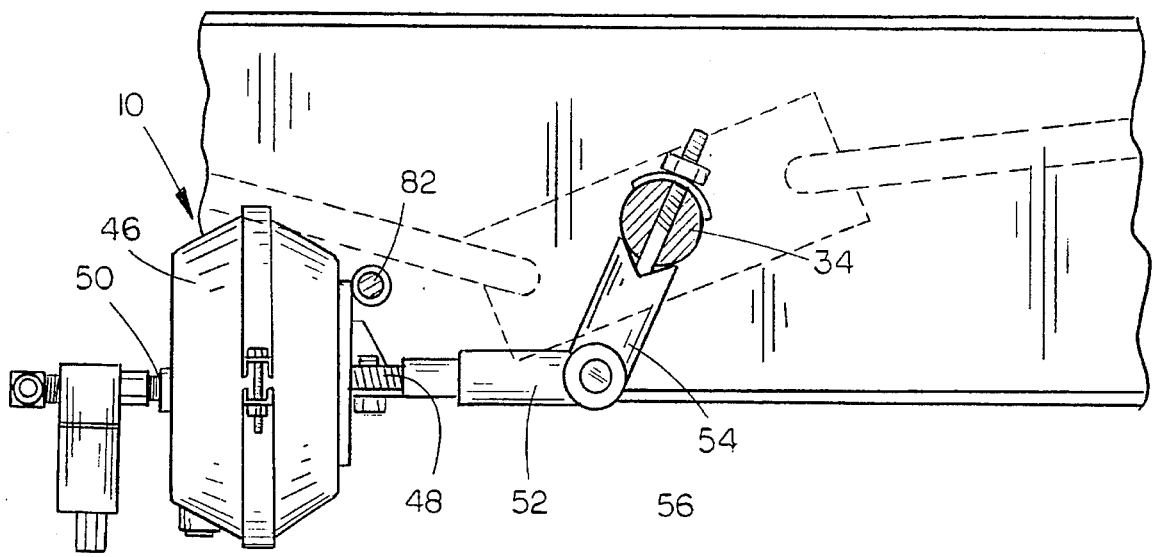
FIG. 3 is a view similar to FIG. 2 except that the air powered actuator has been actuated to rotate the crank shaft to pull the locking pins.
Figure 4:
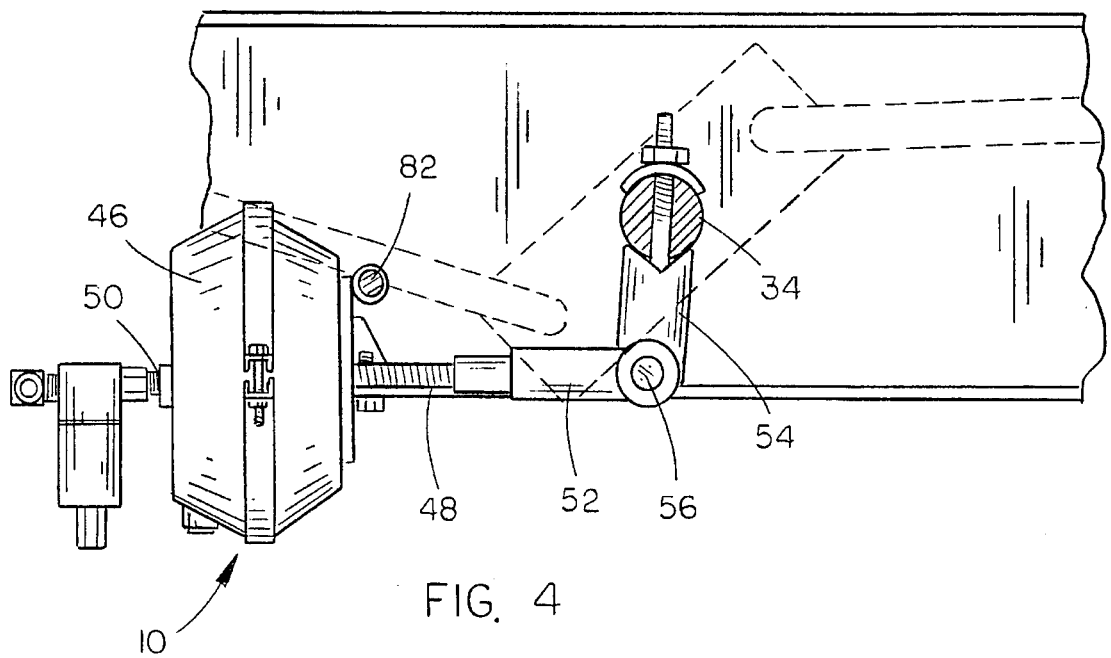
FIG. 4 is a top view illustrating the mounting means of this invention secured to a slider frame.
Figure 5:
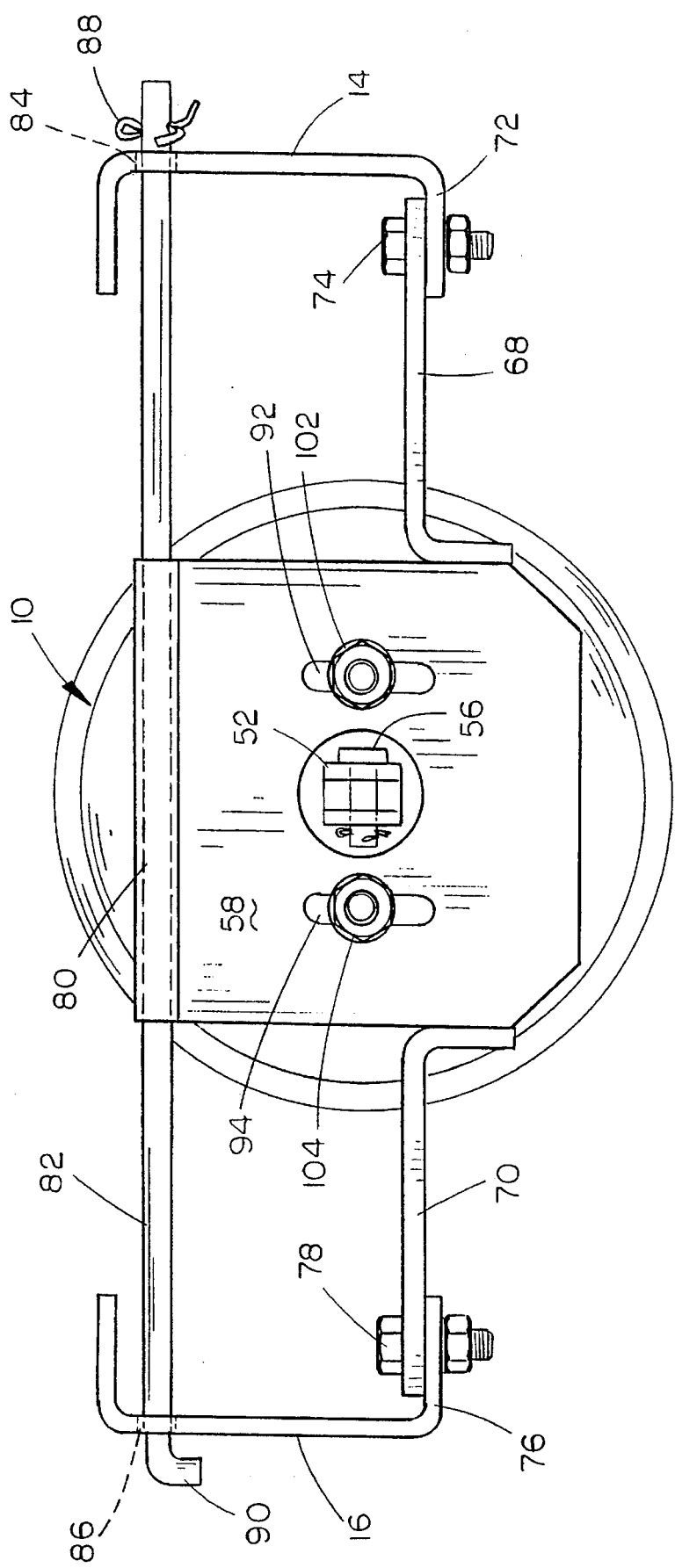
FIG. 5 is a plan view of the mounting means.

A plurality of locking pins, each designated with the reference numeral 30, are provided for locking the frame 20 in various positions of adjustment relative to the side rails 26 and 28. Four such pins are illustrated in FIG. 2, two at the front of the slider 20 and two at the rear of the slider. The locking pins 30 are suitably supported by mounting plates secured to the slide members 22 and 24 for horizontal linear movement in a direction generally transverse to the longitudinal axis of the trailer and are conjointly retractable for permitting adjustment of the frame 18 of slider 20 to various positions of adjustment relative to the side rails 26 and 28 and extensible for locking the frame 18 in a selected position of adjustment.

The locking pins 32 are conjointly movable between extended and retracted positions by means of linkage generally indicated at 32 interconnecting the pins. The linkage 32 comprises a shaft extending longitudinally of the frame generally parallel to the slide members 22 and 24 and approximately midway therebetween. One end of shaft 34 is rotatably journaled in cross-frame members 14 and 16, while the other end is suitable journaled in a cross-frame member 36. A plurality of links 38, one for each locking pin 30, interconnect the shaft 34 and the pins 30. The inner ends of the links 38 connecting the two locking pins 30 at the rear of the slider are pivotally connected to opposite ends of plate 40 which is secured to the shaft 34. The inner ends of the links 38 at the forward end of the slider are pivotally connected to a plate 42. Thus, when shaft 34 is rotated in a first direction, the links 38 will pull the pins 30 from their extended positions to their retracted positions. Conversely, when the shaft 34 is rotated in a direction opposite to that just described, the links 38 will move the pins 30 towards their extended positions. The springs 44 on the locking pins 30 urge the locking pins 30 to their extended positions.

For purposes of description, air powered actuator 10 includes a pressure cylinder or canister 46 of conventional design having an actuator rod 48 extending from one side of the canister. Canister 46 has an air inlet opening 50 which is connected to a source of air under pressure. When air under pressure is supplied to the canister 46, the rod 48 is extended therefrom in conventional fashion. Preferably, the pressure cylinder or canister 46 is of the type which is normally associated with vehicle air brakes. Rod 48 has a clevis 52 mounted thereon which has one end of connector 54 pivotally connected thereto by means of pin 56. When the air powered actuator is installed, connector 54 extends through an opening formed in shaft 34. Mounting bracket 12 includes a substantially vertically disposed central portion 58 including an upper end 60, lower end 62, a forward end 64, and a rearward end 66. A first support arm 68 extends forwardly from the forward end 64 of central portion 58 at the lower end thereof. A second support arm 70 extends rearwardly from the rearward end 66 of the central portion 58 at the lower end thereof. The forward end of support arm 68 is secured to the lower flange 72 of frame member 14 by bolt 74. The rearward end of support arm 70 is secured to the lower flange 76 of frame member 16 by bolt 78.

A horizontally disposed tube 80 is welded to one side of central portion 58 and is adapted to slidably receive the elongated rod 82 therein. Frame members 14 and 16 are provided with openings 84 and 86 formed therein adjacent the upper ends thereof which are adapted to receive the rod 82 therein. Rod 82 is maintained in the frame members 14 and 16 by the cotter key 88 at one end of the rod and the hook portion 90 at the other end thereof.

Central portion 58 is provided with a pair of vertically disposed slots 92 and 94 formed therein which are adapted to adjustably receive the mounting studs 96 and 98, respectively, which extend from one side of the canister 46. Central portion 58 is also provided with an opening 100 formed therein adapted to receive the actuator rod 48 and the clevis 52.

The air powered actuator 10 of this invention is easily installed on those sliders having horizontally spaced-apart frame members such as frame members 14 and 16. During the construction of the slider, the mounting bracket 12 would normally be installed on the frame members 14 and 16. Normally, the air powered actuator 10 would not be installed at this time to prevent damage to the same during further assembly of the slider. When it is desired to mount the air powered actuator 10 on the mounting bracket 12, the clevis 52 and rod 48 are extended through the opening 100 and the mounting studs 96 and 98 are extended through the slots 92 and 94. Nuts 102 and 104 are then secured to the studs 96 and 98, respectively. The connector 54, if not previously connected to the shaft 34, would be so connected at this time.

Thus it can be seen that a novel mounting bracket has been described which permits an air powered actuator to be quickly and easily installed on a slider.

Thus it can be seen that the invention accomplishes at least all of its stated objectives.

I claim:

1. A slider for adjustment of the suspension of a vehicle longitudinally with respect to the body of the vehicle, the slider comprising a pair of side rails adapted to be secured at the left and right sides of the body in a fixed position extending longitudinally of the body, and a frame adapted to carry the suspension comprising left and right slide members slidable longitudinally of the body on the side rails, said frame including at least first and second horizontally-spaced apart frame members which extend between said left and right slide members, each of said frame members having upper and lower ends, first and second locking pins for locking the frame in various positions of adjustment relative to the side rails, said first and second locking pins being retractable for permitting adjustment of the frame to a selected position of adjustment and extensible for locking the frame in a selected position of adjustment, means for retracting said first and second locking pins including linkage interconnecting said first and second locking pins for conjoint movement of the locking pins between extended and retracted positions, spring means associated with said locking pins for yieldably urging said locking pins to their extended positions wherein the improvement comprises:

an air powered actuator means mounted on said slider including a movable actuator extending therefrom which is operatively secured to said linkage to effect retraction of said first and second locking pins;

said air powered actuator means including a mounting bracket having a substantially vertically disposed central portion including an upper end, a lower end, a rearward end, and a forward end, a first support arm extending forwardly from the forward end of said central portion at the lower end thereof, said first support arm being secured to said first frame member at the lower end thereof, a second support arm extending rearwardly from the rearward end of said central portion at the lower end thereof, said second support arm being secured to said second frame member at the lower end thereof, a horizontally disposed tube secured to the upper end of said central portion, an elongated rod removably received by said tube, one end of said elongated rod extending through said first frame member at the upper end thereof, the other end of said elongated rod extending through said second frame member at the upper end thereof, said elongated rod including means for maintaining said rod in said first and second frame members.

* * * * *